(12) United States Patent  
Wheater et al.

(10) Patent No.: US 8,408,230 B2
(45) Date of Patent: Apr. 2, 2013

(54) TEMPERATURE COMPENSATED I/P CONVERTER

(75) Inventors: Chris Wheater, York (GB); Paul Hartley, North Yorkshire (GB); Rajendra Parmar, West Yorkshire (GB)

(73) Assignee: Norgren Limited, Staffordshire (GB)

( * ) Notice: Subject to any disclaimer, the term of this patent is extended or adjusted under 35 U.S.C. 154(b) by 799 days.

(21) Appl. No.: 12/530,245

(22) PCT Filed: Mar. 16, 2007

(86) PCT No.: PCT/EP2007/002335
§ 371 (c)(1), (2), (4) Date: Sep. 8, 2009

(87) PCT Pub. No.: WO2008/113371
PCT Pub. Date: Sep. 25, 2008

(65) Prior Publication Data
US 2010/0108149 A1    May 6, 2010

(51) Int. Cl.
*G05D 16/00* (2006.01)
(52) U.S. Cl. .................................................. 137/82
(58) Field of Classification Search .......... 137/82–86; 335/217; 251/905
See application file for complete search history.

(56) References Cited

U.S. PATENT DOCUMENTS

| 3,612,103 | A | * | 10/1971 | Waddington | 137/83 |
| 3,645,293 | A | * | 2/1972 | Pedersen | 137/82 |
| 3,817,488 | A | * | 6/1974 | Mack | 251/30.03 |
| 4,002,318 | A | | 1/1977 | Koch | |
| 4,336,819 | A | * | 6/1982 | Nishihara | 137/82 |
| 4,579,137 | A | * | 4/1986 | Brandt, Jr. | 137/82 |
| 4,793,372 | A | | 12/1988 | Gauthier et al. | |
| 4,848,726 | A | * | 7/1989 | Hary | 251/905 |
| 5,257,639 | A | * | 11/1993 | Prescott et al. | 137/82 |
| 5,474,100 | A | * | 12/1995 | Nishijima et al. | 137/82 |
| 5,906,218 | A | * | 5/1999 | Carey | 137/82 |
| 6,079,435 | A | | 6/2000 | Franz et al. | |
| 6,247,461 | B1 | | 6/2001 | Smith et al. | |

FOREIGN PATENT DOCUMENTS

| DE | 4326507 A1 | 2/1995 |
| DE | 10351504 A1 | 6/2005 |
| EP | 0814270 B1 | 12/1997 |

* cited by examiner

*Primary Examiner* — Eric Keasel
(74) *Attorney, Agent, or Firm* — The Ollila Law Group LLC

(57) ABSTRACT

An I/P converter is disclosed. The I/P converter comprises a nozzle (7) coupled to a magnetic circuit. A temperature compensation ring (3) is coupled to the top side of the magnetic circuit. A flexure (1) is coupled to the temperature compensation ring. The temperature compensation ring is configured to position the flexure relative to a first end of the nozzle and the temperature compensation ring is configured to maintain the relative position between the nozzle and the flexure over a range of temperatures.

5 Claims, 2 Drawing Sheets

TEMPERATURE COMPENSATED I/P CONVERTER

BACKGROUND OF THE INVENTION

This invention relates to electric-to-pressure converters, more commonly referred to in the art as 'I/P Converters', which are pressure control instruments used to provide a fluid, usually compressed air, pressure output that is linearly or otherwise proportional to an electrical input signal.

I/P converters are commonly used in connection with process controls in various applications, for example where an electric signal is utilised to control a diaphragm-actuated pneumatic valve, cylinder, or positioner. To achieve consistency in the control process utilizing the diaphragm-actuated pneumatic valve, cylinder, or positioner, the I/P converter must provide a consistent output pressure for a consistent input electric signal irrespective of variations in the external environmental, for example a temperature variation. Any change from the expected value in the output pressure of the I/P converter, caused by the variation in the external environment, will cause errors and consequently inefficiencies in the control process.

Typical I/P converters commonly found in the marketplace do not have any mechanism to prevent undesirable changes in the output pressure of the converter due to changes in temperature. Patent EP0591925 describes a method for temperature compensating an I/P converter using a microprocessor combined with closed loop electronics. This solution is both costly and complex.

ASPECTS

One aspect of the invention includes, an I/P converter, comprising:
a flexure;
a magnetic circuit;
a nozzle having a first end, where the nozzle is coupled to the magnetic circuit at a first location; and
a temperature compensation ring coupled to the magnetic circuit and the flexure.
Preferably, the magnetic circuit comprises:
a magnet;
an outer core; and
and inner core.
Preferably, temperature compensation ring has a higher coefficient of thermal expansion than inner core.
Preferably, temperature compensation ring has a higher coefficient of thermal expansion than magnet.
Preferably, the magnet inner core and the magnet outer core are made from steel, the magnet is made from Neodymium and the temperature compensation ring is made from aluminum.
Another aspect of the invention comprises:
positioning a nozzle relative to a flexure;
maintaining the relative position between the nozzle and the flexure over a change in temperature using a temperature compensation ring.
Preferably, the method further comprises the temperature compensation ring has a coefficient of thermal expansion that is different than the coefficient of thermal expansion of the nozzle.
Another aspect of the invention comprises:
coupling a nozzle to a magnetic circuit;
attaching a temperature compensation ring onto a top side of the magnetic circuit;
coupling a flexure to the temperature compensation ring where the temperature compensation ring is configured to position the flexure relative to a first end of the nozzle and where the temperature compensation ring is configured to maintain the relative position between the nozzle and the flexure over a range of temperatures.
Preferably, the method further comprises the temperature compensation ring is fabricated from aluminum.
Preferably, the method further comprises the magnetic circuit further comprises:
a magnet inner core where the nozzle is coupled to the magnet inner core;
a magnet having a top side and a bottom side where the bottom side is attached to a top side of the magnet inner core;
a magnet outer core having a top side and a bottom side and where the bottom side is attached to the top side of the magnet and the top side of the magnet outer core is the top side of the magnetic circuit.

DETAILED DESCRIPTION

Figure 1:
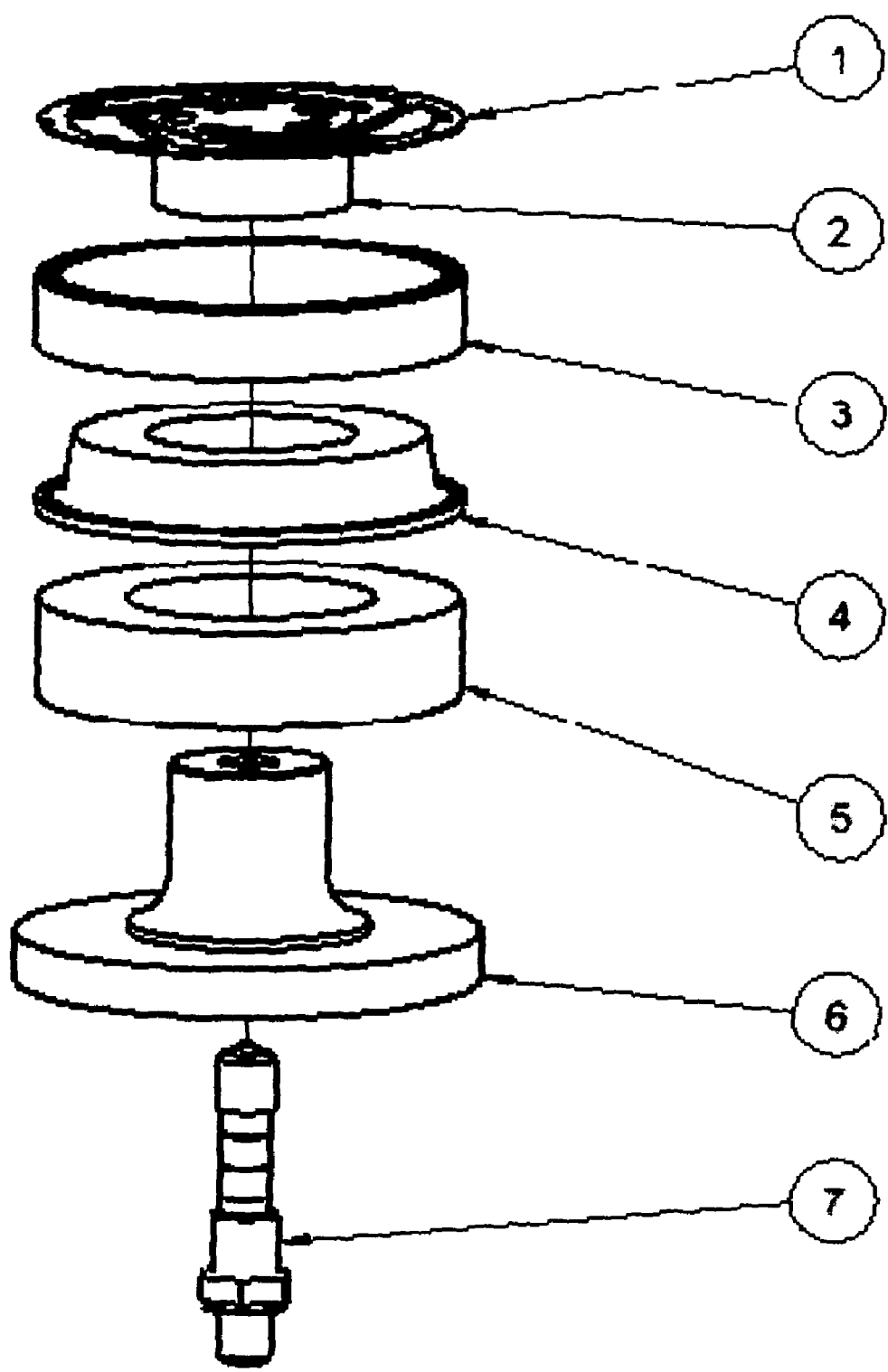
FIG. 1 is an exploded view of I/P converter 100 in an example embodiment of the invention.
Figure 2:
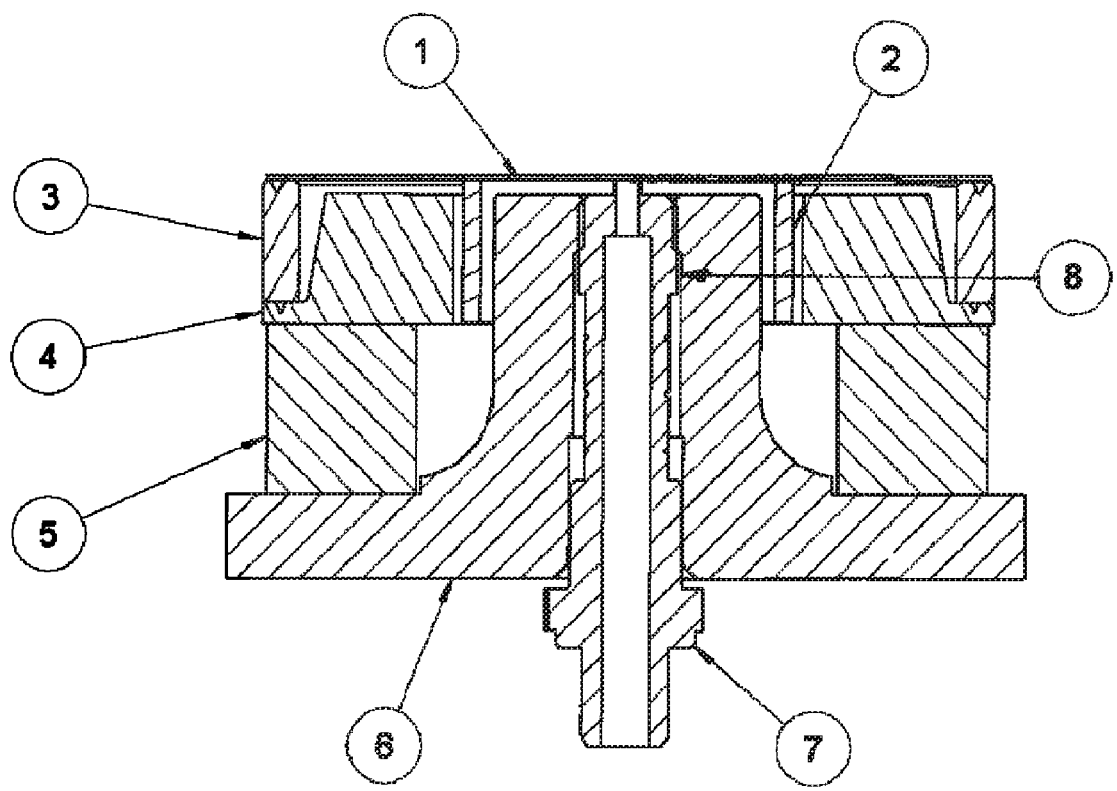
FIG. 2 is a cross sectional view of I/P converter 100 in an example embodiment of the invention.

FIGS. 1-2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 is an exploded view of I/P converter 100 in an example embodiment of the invention. I/P converter 100 comprises a flexure 1, a coil 2, a temperature compensation ring 3, a magnet outer core 4, a magnet 5, a magnet inner core 6 and a nozzle 7. The nozzle 7 is preferably of a tubular construction.

FIG. 2 is a cross sectional view of I/P converter 100 in an example embodiment of the invention. One end of nozzle 7 forms an interface with flexure 1. The other end of the nozzle 7 connects to a chamber that contains the fluid of which the pressure is to be controlled (not shown). The outer surface of nozzle 7 is threaded to enable the position of nozzle 7 to be adjusted relative to flexure 1. Nozzle 7 is held in position relative to flexure 1 by a threaded interface 8 within magnet inner core 6. Magnet inner core 6 is constructed of steel or another magnetically conductive material, Affixed to magnet inner core 6 is magnet 5. Magnet 5 is constructed of Neodymium or another permanently magnetized material. Magnet outer core 4 is attached magnet 5. Magnet outer core 4 is constructed of steel or another magnetically conductive material. Magnet inner core 6, magnet 5 and magnet outer core 4 form a magnetic circuit. This magnetic circuit passes magnetic flux though a gap between magnet inner core 6 and magnet outer core 4. Coil 2 is positioned in the gap between magnet inner core 6 and magnet outer core 4.

Temperature compensation ring 3 is attached to magnet outer core 4. Temperature compensation ring 3 is constructed of aluminum or any other material with a different coefficient of thermal expansion than magnet outer core 4. Flexure 1 is attached to temperature compensation ring 3. Coil 2 consists of one or more turns of copper or other electrically conductive material. Coil 2 is attached to flexure 1 and electrically connected to a drive circuit. The construction of flexure 1 allows coil 2 to move along the axis of nozzle 7, yet constrains coil 2 from interference with either magnet inner core 6 or magnet outer core 4.

The interaction between the magnetic field passing through coil 2, generated by the magnetic circuit, and the electrical current passing through coil 2 derived from the drive circuit, act to create an electro-magnetic motor force that is in turn transferred through coil 2 to flexure 1. As the number of turns and geometry of the coil 2 are predominately fixed, and the magnetic field produced by magnet inner core 6, magnet 5 and magnet outer core 4 is predominately constant, the force transferred though coil 2 to flexure 1 is predominately proportional to the current flowing through coil 2 and thus the electrical drive.

The construction of flexure 1 is such that it forms a pneumatic interface with nozzle 7. The pressure of fluid to be controlled is transferred through nozzle 7 to flexure 1. As the geometry of nozzle 7 and flexure 1 are predominately constant, the force applied to flexure 1 is predominately proportional to the pressure within nozzle 1 and in turn the pressure of the controlled fluid.

During normal operation, a force balance is maintained between the electro-magnetic derived force and the pneumatically derived force, and thus the pressure of the controlled fluid is controlled in proportion to the electrical drive signal. Any construction of flexure 1 will have a finite elasticity, and thus act like a spring applying a force restoring flexure 1 to its neutral position. Consequently, any disturbances to the geometry that dictate the distance between the top of the temperature compensation ring 3 where flexure 1 is connected and the top of nozzle 7 will cause disturbances to the elastic restoritary force of flexure 1 and consequently disturbances to the pressure of the controlled fluid.

One known cause of such a disturbance to the geometry is temperature. The distance between the top of the temperature compensation ring 3 where flexure 1 is connected and the top of nozzle 7 is dictated by nozzle 7, magnet inner core 6, magnet 5, magnet outer core 4 and temperature compensation ring 3, and in turn each of these invariably have dissimilar coefficients of thermal expansion. Due to the dissimilar thermal expansion coefficients, each part will expand at a different rate and the distance between the top of the temperature compensation ring 3 and the top of nozzle 7 will change as the temperature changes.

Within the preferred embodiment, the dimensions and materials of the design cumulate to no changes in the distance between the top of temperature compensation ring 3 and the top of nozzle 7 and consequently, no disturbance to the pressure of the controlled fluid with temperature. This outcome is achieved because the coefficient of expansion of the magnet 5, which is lower than the steel in magnet inner core 6, is counteracted upon by the coefficient of expansion of the temperature compensation ring 3, which is higher than that of the steel in the magnet inner core 6. The two dissimilarities in coefficient of thermal expansion cancel each other out.

Within other variations to the design any combination of geometries and materials may be selected to derive any desired positive or negative disturbance to the pressure of the controlled fluid with temperature. For example, the pressure delivered by the I/P controller may be adjusted such that the pressure increases as the temperature decreases.

We claim:
1. An VP converter, comprising:
    a flexure (1);
    a magnetic circuit comprising:
        an inner core (6) including a nozzle bore, a substantially cylindrical portion, and a flange extending substantially radially outwardly from the substantially cylindrical portion;
        an annular outer core (4) including an aperture that fits over a least a portion of the inner core (6) and is substantially coaxial with the inner core (6); and
        an annular magnet (5) sandwiched between the outer core (4) and the flange of the inner core (6);
    a nozzle (7) having a first end, where the nozzle (7) is received in the nozzle bore of the inner core (6) and is coupled to the magnetic circuit at a first location; and
    a temperature compensation ring (3) coupled to the annular outer core (4) of the magnetic circuit and to the flexure (1), where the temperature compensation ring (3) comprises a sole support for the flexure (1) and is configured to maintain the relative position between the nozzle (7) and the flexure (1) over a range of temperatures, wherein a temperature compensation ring coefficient of thermal expansion is higher than an inner core coefficient of thermal expansion and wherein a temperature compensation ring thermal expansion/contraction cancels out a magnet thermal expansion/contraction.

2. The I/P converter of claim 1 wherein the temperature compensation ring (3) has a higher coefficient of thermal expansion than the magnet (5).

3. The I/P converter of claim 1 where the magnet inner core (6) and the magnet outer core (4) are made from steel, the magnet (5) is made from Neodymium, and the temperature compensation ring (3) is made from aluminum.

4. A method for fabricating an I/P converter, comprising:
    coupling a nozzle to a magnetic circuit, with the magnetic circuit comprising:
        an inner core including a nozzle bore, a substantially cylindrical portion, and a flange extending substantially radially outwardly from the substantially cylindrical portion, where the nozzle is received in the nozzle bore and is coupled to the magnet inner core;
        an annular outer core including an aperture that fits over at least a portion of the inner core and is substantially coaxial with the inner core, with the annular outer core having a top side and a bottom side and where the bottom side is attached to the top side of the magnet and the top side of the magnet outer core is the top side of the magnetic circuit;
        an annular magnet sandwiched between the outer core and the flange of the inner core;
    attaching a temperature compensation ring to the annular outer core of the magnetic circuit;
    coupling a flexure to the temperature compensation ring, where the temperature compensation ring comprises a sole support for the flexure and where the temperature compensation ring is configured to position the flexure relative to a first end of the nozzle and where the temperature compensation ring is configured to maintain the relative position between the nozzle and the flexure over a range of temperatures, wherein a temperature compensation ring coefficient of thermal expansion is higher than an inner core coefficient of thermal expansion and wherein a temperature compensation ring thermal expansion/contraction cancels out a magnet thermal expansion/contraction.

5. The method for fabricating an I/P converter of claim 4 where the temperature compensation ring is fabricated from aluminum.

* * * * *